US009887406B2

(12) United States Patent
Honda et al.

(10) Patent No.: US 9,887,406 B2
(45) Date of Patent: *Feb. 6, 2018

(54) SEPARATOR FOR NON-AQUEOUS SECONDARY BATTERY, METHOD FOR MANUFACTURING THE SAME, AND NON-AQUEOUS SECONDARY BATTERY

(71) Applicant: TEIJIN LIMITED, Osaka-shi, Osaka (JP)

(72) Inventors: Susumu Honda, Iwakuni (JP); Satoshi Nishikawa, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 514 days.

This patent is subject to a terminal disclaimer.

(21) Appl. No.: 14/381,376

(22) PCT Filed: Feb. 25, 2013

(86) PCT No.: PCT/JP2013/054810
§ 371 (c)(1),
(2) Date: Aug. 27, 2014

(87) PCT Pub. No.: WO2013/133074
PCT Pub. Date: Sep. 12, 2013

(65) Prior Publication Data
US 2015/0236323 A1    Aug. 20, 2015

(30) Foreign Application Priority Data

Mar. 9, 2012  (JP) .................................. 2012-052910

(51) Int. Cl.
*H01M 2/16* (2006.01)
*H01M 10/0525* (2010.01)
*H01M 2/14* (2006.01)

(52) U.S. Cl.
CPC ......... *H01M 2/1686* (2013.01); *H01M 2/145* (2013.01); *H01M 2/168* (2013.01); *H01M 10/0525* (2013.01); *H01M 2220/30* (2013.01)

(58) Field of Classification Search
CPC .... H01M 2/1686; H01M 2/168; H01M 2/166; H01M 2/165; H01M 10/0525; H01M 10/052; H01M 2/145; H01M 2220/30
See application file for complete search history.

(56) References Cited

U.S. PATENT DOCUMENTS 7,923,156 B2      4/2011  Dasgupta et al.
2002/0168569 A1*  11/2002  Barriere ................ H01M 2/164
                                                                 429/217

(Continued)

FOREIGN PATENT DOCUMENTS

CN    101542777 A    9/2009
CN    101960646 A    1/2011

(Continued)

OTHER PUBLICATIONS

JP2011-138761A, Machine Translation, Chiba, Jul. 2011.*

(Continued)

*Primary Examiner* — Devina Pillay
(74) *Attorney, Agent, or Firm* — Sughrue Mion, PLLC

(57) ABSTRACT

The present invention provides a separator for a non-aqueous secondary battery including a porous substrate and an adhesive layer that is formed on one side or both sides of the porous substrate and is an aggregate layer of particles that include a polyvinylidene fluoride resin, the adhesive layer further including a filler that includes at least one of an organic compound or an inorganic compound, the content of the filler being from 20% by mass to 80% by mass, with respect to the total mass of the mass of the particles and the (Continued)

mass of the filler, and the content of the particles per one adhesive layer being from 0.1 g/m² to 6.0 g/m².

8 Claims, 3 Drawing Sheets

(56) References Cited

U.S. PATENT DOCUMENTS

| | | | | |
|---|---|---|---|---|
| 2007/0264577 | A1* | 11/2007 | Katayama | H01M 2/162 |
| | | | | 429/246 |
| 2009/0067119 | A1 | 3/2009 | Katayama et al. | |
| 2011/0039145 | A1 | 2/2011 | Abe et al. | |
| 2011/0293976 | A1 | 12/2011 | Chiba et al. | |
| 2012/0094184 | A1* | 4/2012 | Abe | H01G 9/02 |
| | | | | 429/251 |
| 2015/0030906 | A1* | 1/2015 | Amin-Sanayei | H01G 11/52 |
| | | | | 429/144 |

FOREIGN PATENT DOCUMENTS

| | | |
|---|---|---|
| CN | 102088067 A | 6/2011 |
| CN | 103947009 A | 7/2014 |
| JP | 10-172606 A | 6/1998 |
| JP | 10-177865 A | 6/1998 |
| JP | 10-189054 A | 7/1998 |
| JP | 11-260341 A | 9/1999 |
| JP | 2003-077545 A | 3/2003 |
| JP | 2003-086162 A | 3/2003 |
| JP | 2003-323878 A | 11/2003 |
| JP | 2004-253380 A | 9/2004 |
| JP | 2008-123988 A | 5/2008 |
| JP | 2008-524824 A | 7/2008 |
| JP | 2009-032677 A | 2/2009 |
| JP | 2009-070609 A | 4/2009 |
| JP | 2010-244875 A | 10/2010 |
| JP | 2011-138761 A | 7/2011 |
| JP | 2011-171290 A | 9/2011 |

OTHER PUBLICATIONS

JP2004-253380A, Machine Translation, Hongan, Sep. 2004.*
Communication dated May 20, 2016, issued by the Taiwanese Intellectual Property Office in corresponding Taiwanese Application No. 102107845.
Communication dated Aug. 8, 2016, issued by the State Intellectual Property Office of the P.R.C. in corresponding Chinese Application No. 201380010720.X.
Japanese Office Action for JP 2013-540139 dated Oct. 29, 2013.
International Search Report for PCT/JP2013/054810 dated May 14, 2013.
Written Opinion for PCT/JP2013/054810 dated May 14, 2013.
Communication dated Dec. 21, 2015, issued by the State Intellectual Property Office of the P.R.C. in corresponding Chinese Application No. 201380010720.X.
Chinese Office Action dated Feb. 16, 2017, for Application No. 201380010720.X, 13 pages total including partial English translation.

* cited by examiner

SEPARATOR FOR NON-AQUEOUS SECONDARY BATTERY, METHOD FOR MANUFACTURING THE SAME, AND NON-AQUEOUS SECONDARY BATTERY

CROSS REFERENCE TO RELATED APPLICATIONS

This application is a National Stage of International Application No. PCT/JP2013/054810 filed Feb. 25, 2013 (claiming priority based on Japanese Patent Application No. 2012-052910 filed Mar. 9, 2012), the contents of which are incorporated herein by reference in their entirety.

TECHNICAL FIELD

The present invention relates to a separator for a non-aqueous secondary battery, a method for manufacturing the same, and a non-aqueous secondary battery.

BACKGROUND ART

Non-aqueous secondary batteries having a high energy density, such as lithium ion secondary batteries, have been widely used as power supply for portable electronic devices such as lap-top computers, mobile phones, digital cameras, and camcorders. Further, in recent years, since these batteries have a high energy density, application of these batteries to automobiles and the like has also been studied.

In conjunction with reductions in size and weight of portable electronic devices, the outer casing of a non-aqueous secondary batteries has been simplified. Non-aqueous secondary batteries initially had a battery can made of stainless steel, but a battery with an aluminum can has been developed, and further, currently a battery with a soft pack made of an aluminum laminate pack has also been developed. In the case of a soft pack outer casing made of aluminum laminate, since the outer casing is soft, joining between an electrode and a separator becomes inappropriate during charging and discharging. This may cause a technical problem of reducing the cycle life. From the viewpoint of addressing this problem, a technique for bonding an electrode and a separator becomes important, and many technical proposals have been made nowadays.

As one of such techniques, a separator in which an adhesive layer formed of a polyvinylidene fluoride resin is stacked on a polyolefin microporous membrane that is a conventional separator, has been proposed. The adhesive layer formed of a polyvinylidene fluoride resin favorably bonds to the electrode, when such an adhesive layer with an electrolyte contained therein and an electrode are subjected to heat pressing, and the adhesive layer formed of a polyvinylidene fluoride resin has a function of an adhesive that joins the electrode and the separator together. Accordingly, the cycle life of a soft pack battery can be favorably improved. In view of such a background, various technical proposals for a separator have been made in the past.

For example, in Patent Document 1 to Patent Document 3, from the viewpoint of achieving both the ensuring of sufficient adhesive property and ion permeability, technical proposals focusing upon the porous structure of a polyvinylidene fluoride resin layer have been made. Further, in Patent Document 4 to Patent Document 7, from the viewpoint of ensuring sufficient adhesive property, studies on polyvinylidene fluoride resins have been made, and an appropriate coating mass and composition have been proposed.

Meanwhile, in the process of manufacturing a battery, since the handling property of a separator has a great influence on the process yield at the time of manufacture of a battery, a technique of forming a lubricating layer, that is formed of a filler, on a separator surface, to improve the slipping property, has been proposed in Patent Document 8.

Further, in Patent Document 9, a technique of producing a separator having excellent electronic characteristics and excellent safety, by using a mixture containing barium titanate as inorganic particles and a poly(vinylidene fluoride-chlorotrifluoroethylene) copolymer (PVDF-CTFE) as a binder polymer has been proposed.

Moreover, in Patent Document 10, a separator manufactured by coating, on a polyolefin substrate, a coating liquid containing silica particles, polyethylene particles, and a PVDF/acryl water-dispersion, and then drying the coating liquid has been proposed.

Patent Document 1: Japanese Patent Application Laid-Open (JP-A) No. 2003-86162
Patent Document 2: JP-A No. 2009-70609
Patent Document 3: JP-A No. 2003-77545
Patent Document 4: JP-A No. H11-260341
Patent Document 5: JP-A No. H10-172606
Patent Document 6: JP-A No. H10-177865
Patent Document 7: JP-A No. H10-189054
Patent Document 8: JP-A No. 2010-244875
Patent Document 9: Japanese National-Phase Publication No. 2008-524824
Patent Document 10: JP-A No. 2011-171290

SUMMARY OF INVENTION

Technical Problem

Here, the porous layer formed of a polyvinylidene fluoride resin, which is described in Patent Document 1 to Patent Document 3, is joined to a binder resin that binds the active materials in an electrode by heat pressing. Therefore, in order to ensure favorable adhesive property, the larger amount of the resin, the better.

However, in order to realize a higher energy density of a battery, it is important to increase the active material ratio in the electrode and, as a result, the lower the content of the binder resin as a binding agent, the better. Therefore, according to the conventional techniques, in order to ensure sufficient adhesive property, it has been necessary to apply a severe heat pressing condition. However, under such a heat pressing condition, the porous structure of the porous layer formed of a polyvinylidene fluoride resin cannot be maintained, so that ion permeability becomes insufficient, and it has been difficult to obtain favorable battery characteristics.

By the methods described in Patent Document 4 to Patent Document 7, in the formation of the adhesive layer, a solution obtained by dissolving polyvinylidene fluoride in a high boiling point solvent, such as N-methylpyrrolidone, is coated on a polyolefin microporous membrane, and then an electrode is affixed thereto, followed by drying. Therefore, the obtained integrated product is inferior in uniformity, and there has been a problem in that the solvent remains inside the battery.

Further, by the method described in Patent Document 8, although slipping property can be ensured, there has been a problem in that the obtained separator does not have adhesive property with respect to electrodes.

Moreover, by the method described in Patent Document 9, in the production of the separator, a polymer organic solvent solution containing inorganic particles is used and drying is performed, and thus, it is important to heighten the content of the inorganic particles for the purpose of ensuring ion permeability, and although slipping property and rate characteristics can be ensured, there has been a problem in that the obtained separator does not have sufficient adhesive property with respect to electrodes.

In addition, by the technique described in Patent Document 10, there has been a problem in that the obtained separator does not have adhesive property with respect to electrodes.

Under such a background, a separator for a non-aqueous secondary battery which has excellent adhesion to electrodes, as compared with conventional separators, and ensures favorable ion permeability and handling property has been required.

Further, a method for manufacturing a separator for a non-aqueous secondary battery, the method achieving excellent productivity of a separator for a non-aqueous secondary battery, has been required.

Moreover, a high-energy density, high-performance non-aqueous secondary battery having an aluminum laminate pack outer casing has been required.

Solution to Problem

In order to address the problems described above, the invention is configured as follows.

<1> A separator for a non-aqueous secondary battery, including:
a porous substrate, and
an adhesive layer that is formed on one side or both sides of the porous substrate and is an aggregate layer of particles that include a polyvinylidene fluoride resin,
the adhesive layer further including a filler that includes at least one of an organic compound or an inorganic compound,
a content of the filler being from 20% by mass to 80% by mass with respect to a total mass of a mass of the particles and a mass of the filler, and
a content of the particles per one adhesive layer being from 0.1 g/m$^2$ to 6.0 g/m$^2$.

<2> A separator for a non-aqueous secondary battery, including:
a porous substrate, and
an adhesive layer that is formed on one side or both sides of the porous substrate and is an aggregate layer of particles that include a polyvinylidene fluoride resin,
the adhesive layer further including a filler that includes at least one of an organic compound or an inorganic compound,
a content of the filler being from 15% by volume to 90% by volume, with respect to a total volume of a volume of the particles and a volume of the filler, and
a content of the particles per one adhesive layer being from 0.1 g/m$^2$ to 6.0 g/m$^2$.

<3> The separator for a non-aqueous secondary battery according to <1> or <2> having a Gurley value of 300 sec/100 cc or less.

<4> The separator for a non-aqueous secondary battery according to any one of <1> to <3>, wherein an average particle diameter of the particles is from 0.01 μm to 1 μm.

<5> The separator for a non-aqueous secondary battery according to any one of <1> to <4>, wherein the polyvinylidene fluoride resin is a copolymer that includes structural units derived from vinylidene fluoride in an amount of 50 mol % or more with respect to all structural units.

<6> The separator for a non-aqueous secondary battery according to any one of <1> to <5>, wherein the organic compound is one or more resins selected from the group consisting of a crosslinked polyacrylic acid, a crosslinked polyacrylic acid ester, a crosslinked polymethacrylic acid, a crosslinked polymethacrylic acid ester, a crosslinked polymethyl methacrylate and a crosslinked polysilicone.

<7> The separator for a non-aqueous secondary battery according to any one of <1> to <6>, wherein the inorganic compound is at least one of a metal hydroxide or a metal oxide.

<8> The separator for a non-aqueous secondary battery according to any one of <1> to <7>, wherein the adhesive layer is formed on both sides of the porous substrate.

<9> The separator for a non-aqueous secondary battery according to any one of <1> to <8>, wherein the porous substrate is a polyolefin microporous membrane including polyethylene.

<10> The separator for a non-aqueous secondary battery according to <9>, wherein the polyolefin microporous membrane includes polyethylene and polypropylene.

<11> A method for manufacturing a separator for a non-aqueous secondary battery according to any one of <1> to <10>, the method including:
a coating process of coating, on one side or both sides of the porous substrate, a water-based dispersion, the water-based dispersion including
    the particles that include a polyvinylidene fluoride resin and
    the filler that includes at least one of an organic compound or an inorganic compound, and
a drying process of drying the coated water-based dispersion.

<12> A non-aqueous secondary battery including a positive electrode, a negative electrode, and the separator for a non-aqueous secondary battery according to any one of <1> to <10>, which is disposed between the positive electrode and the negative electrode,
wherein, in the non-aqueous secondary battery, electromotive force is obtained by lithium doping/dedoping.

Advantageous Effects of Invention

According to the invention, a separator for a non-aqueous secondary battery which has excellent adhesion to electrodes, as compared with conventional separators, and can ensure sufficient ion permeability and handling property is provided. Further, according to the invention, a method for manufacturing a separator for a non-aqueous secondary battery, the method achieving excellent productivity of a separator for a non-aqueous secondary battery, is provided.

By the use of such a separator for a non-aqueous secondary battery, a high-energy density, high-performance non-aqueous secondary battery having an aluminum laminate pack outer casing is provided.

DESCRIPTION OF EMBODIMENTS

<Separator for Non-Aqueous Secondary Battery>

Figure 1:
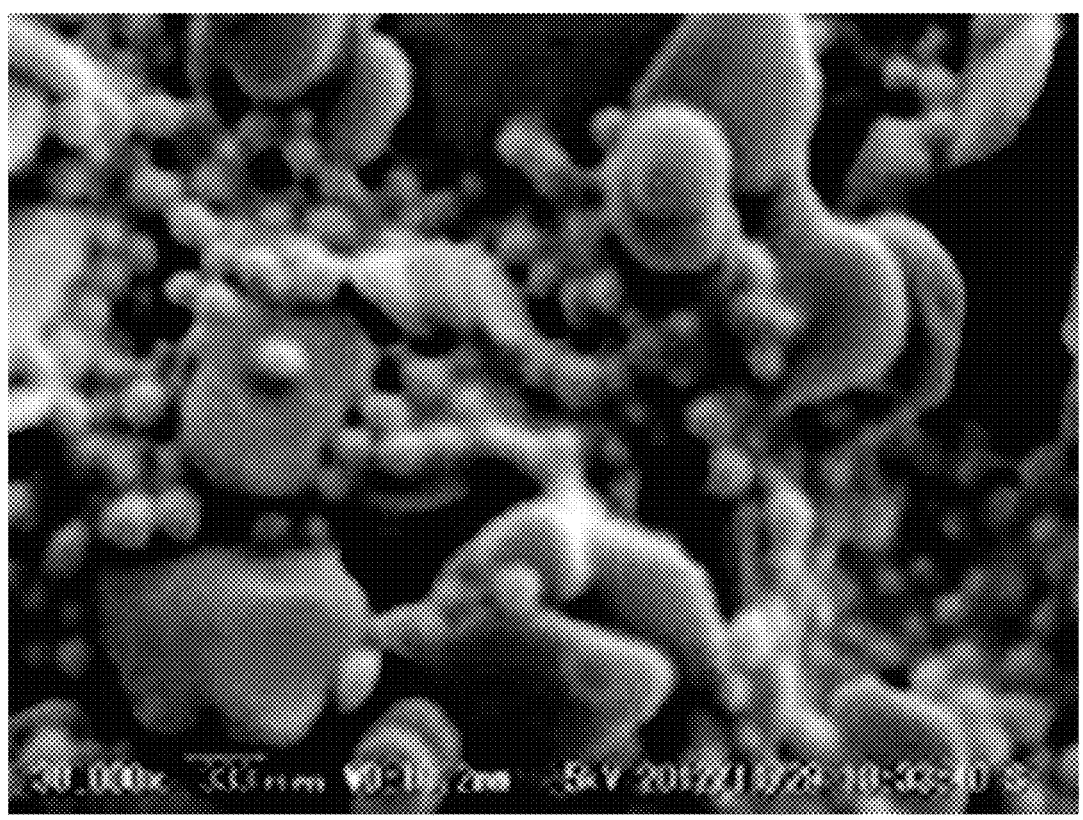
FIG. 1 is an SEM photograph showing the surface of the separator of Example 3.

The separator for a non-aqueous secondary battery of the invention can be classified into a separator for a non-aqueous secondary battery according to the first exemplary embodiment of the invention in which the content of the filler contained in the adhesive layer is seen through the viewpoint of mass, and a separator for a non-aqueous secondary battery according to the second exemplary embodiment of the invention in which the content of the filler contained in the adhesive layer is seen through the viewpoint of volume.

Namely, the separator for a non-aqueous secondary battery according to the first exemplary embodiment of the invention includes a porous substrate, and an adhesive layer that is formed on one side or both sides of the porous substrate and is an aggregate layer of particles that include a polyvinylidene fluoride resin, in which the adhesive layer further includes a filler that includes at least one of an organic compound or an inorganic compound, the content of the filler is from 20% by mass to 80% by mass, with respect to the total mass of the mass of the particles and the mass of the filler, and the content of the particles per one adhesive layer is from 0.1 $g/m^2$ to 6.0 $g/m^2$.

The separator for a non-aqueous secondary battery according to the second exemplary embodiment of the invention includes a porous substrate, and an adhesive layer that is formed on one side or both sides of the porous substrate and is an aggregate layer of particles that include a polyvinylidene fluoride resin, in which the adhesive layer further includes a filler that includes at least one of an organic compound or an inorganic compound, the content of the filler is from 15% by volume to 90% by volume, with respect to the total volume of the volume of the particles and the volume of the filler, and the content of the particles per one adhesive layer is from 0.1 $g/m^2$ to 6.0 $g/m^2$.

Hereinafter, the term "separator for a non-aqueous secondary battery" is also referred to as "separator".

The phrase "particles that include a polyvinylidene fluoride resin" is also referred to as simply "particles".

The phrase "filler that includes at least one of an organic compound or an inorganic compound" is also referred to as simply "filler".

The first exemplary embodiment and second exemplary embodiment of the invention are also generically referred to as simply "separator for a non-aqueous secondary battery of the invention". The matters explained as the "separator for a non-aqueous secondary battery of the invention" are matters that are common to the first exemplary embodiment and second exemplary embodiment of the invention, unless stated otherwise.

Since the adhesive layer included in the separator for a non-aqueous secondary battery of the invention contains a particulate polyvinylidene fluoride resin in an amount described above and a filler in an amount described above, the surface of the separator is roughened, so that the adhesive property between the separator and an electrode is excellent, and also, the slipping property of the separator surface is improved, and thus the separator for a non-aqueous secondary battery of the invention further has excellent handling property. Further, due to the porosity possessed by the polyvinylidene fluoride resin, the separator for a non-aqueous secondary battery of the invention has excellent ion permeability.

Hereinafter, the invention is described in detail. Note that, hereinafter, a numerical range represented by "to" means a numerical range including the upper limit and the lower limit.

[Porous Substrate]

In the invention, the term "porous substrate" means a substrate having pores or voids inside.

Examples of such a substrate include a microporous membrane; a porous sheet formed of a fibrous material, such as nonwoven fabric or a paper-like sheet; a composite porous sheet obtained by layering one or more other porous layers on the above microporous membrane or porous sheet; and the like. Particularly, from the viewpoints of thinning of a separator and high strength, a microporous membrane is preferable.

The "microporous membrane" means a membrane that has a large number of micropores inside, and has a structure in which these micropores are connected, to allow gas or liquid to pass therethrough from one side to the other side.

The material used as a component of the porous substrate may be either an electric insulating organic material or an electric insulating inorganic material. Particularly, from the viewpoint of imparting a shutdown function to the substrate, the material used as a component of the substrate is preferably a thermoplastic resin. As the thermoplastic resin, a thermoplastic resin having a melting point of lower than 200° C. is suitable, and polyolefin is particularly preferable.

The term "shutdown function" refers to the following function. Namely, in a case in which the battery temperature increases, the thermoplastic resin melts and blocks the pores of the porous substrate, thereby blocking migration of ions, to prevent thermal runaway of the battery.

As a porous substrate using polyolefin, a polyolefin microporous membrane is preferable.

As the polyolefin microporous membrane, it is possible to select a polyolefin microporous membrane having sufficient dynamic physical properties and ion permeability, among the polyolefin microporous membranes that have been applied to conventional separators for a non-aqueous secondary battery.

From the viewpoint of exhibiting the shutdown function, it is preferable that the polyolefin microporous membrane includes polyethylene, and it is preferable that the content of polyethylene is 95% by mass or more.

From the viewpoint of imparting heat resistance to such a degree that the membrane does not easily break when exposed to high temperatures, a polyolefin microporous membrane including polyethylene and polypropylene is preferable. An example of such a polyolefin microporous membrane is a microporous membrane in which polyethylene and polypropylene are present as a mixture in one layer. In such a microporous membrane, it is preferable that polyethylene is contained in an amount of 95% by mass or more and polypropylene is contained in an amount of 5% by mass or less, from the viewpoint of achieving both the shutdown function and heat resistance. From the viewpoint of achieving both the shutdown function and heat resistance, a polyolefin microporous membrane having a laminate structure of two or more layers, in which at least one layer includes polyethylene and at least one layer includes propylene, is also preferable.

It is preferable that the polyolefin contained in the polyolefin microporous membrane has a weight average molecular weight (Mw) of from 100,000 to 5,000,000. When the weight average molecular weight is 100,000 or more, sufficient dynamic physical properties can be ensured. Meanwhile, when the weight average molecular weight is 5,000, 000 or less, the shutdown characteristics are favorable, and it is easy to form a membrane.

The polyolefin microporous membrane can be manufactured, for example, by the following method. Namely, an example is a method of forming a microporous membrane by carrying out:

(a-i) a process of extruding a molten polyolefin resin through a T-die to form a sheet, (a-ii) a process of subjecting the above sheet to a crystallization treatment, (a-iii) a process of stretching the sheet, and (a-iv) a process of subjecting the sheet to a heat treatment, in order.

Further, another examples is a method of forming a microporous membrane by carrying out:

(b-i) a process of melting a polyolefin resin together with a plasticizer such as liquid paraffin, and extruding the melt through a T-die, followed by cooling, to form a sheet, (b-ii) a process of stretching the sheet, (b-iii) a process of extracting the plasticizer from the sheet, and (b-iv) a process of subjecting the sheet to a heat treatment, in order, and the like.

Examples of a porous sheet formed of a fibrous material include a porous sheet formed of a fibrous material such as polyester such as polyethylene terephthalate; polyolefin such as polyethylene or polypropylene; or a heat resistant polymer such as aromatic polyamide, polyimide, polyethersulfone, polysulfone, polyetherketone, or polyetherimide, and a porous sheet formed of any mixture of the above fibrous materials.

In the invention, the film thickness of the porous substrate is preferably from 5 μm to 25 μm, from the viewpoint of obtaining favorable dynamic physical properties and internal resistance.

The Gurley value (JIS P8117) of the porous substrate is preferably in a range of from 50 sec/100 cc to 500 sec/100 cc, from the viewpoints of preventing a short circuit in a battery and obtaining sufficient ion permeability.

The porosity of the porous substrate is preferably from 20% to 60%, from the viewpoint of obtaining an appropriate membrane resistance and shutdown function.

The puncture resistance of the porous substrate is preferably 300 g or more, from the viewpoint of improving the production yield.

[Adhesive Layer]

The adhesive layer that is included in the separator of the invention is provided on one side or both sides of the porous substrate, and is an aggregate layer of particles that include a polyvinylidene fluoride resin. This adhesive layer further includes a filler that includes at least one of an organic compound or an inorganic compound. In the first exemplary embodiment, the content of the filler is from 20% by mass to 80% by mass with respect to the total mass of the particles and the filler, and in the second exemplary embodiment, the volume of the filler is from 15% by volume to 90% by volume with respect to the total volume of the volume of the particles and the volume of the filler. The content of the particles per one adhesive layer is from 0.1 g/m$^2$ to 6.0 g/m$^2$.

Since the adhesive layer has such a configuration, the separator has excellent ion permeability and excellent handling property, and in a case in which an electrode and the separator are joined together by heat pressing, a favorable adhesive property can be ensured.

The adhesive layer is an aggregate layer of particles which contains particles including a polyvinylidene fluoride resin as an aggregate. In the invention, the "aggregate layer of particles" has, for example, the following configuration (i) or configuration (ii).

Configuration (i) is a configuration in which particles in the form of primary particles are fixed to the porous substrate, or a configuration in which particles in the form of an aggregate (secondary particles) of particles or an aggregate including a particle and a filler are fixed to the porous substrate.

Configuration (ii) is a configuration in which plural particles, which are adjacent to each other, or particles and a filler are integrally connected to each other in a layered form, and at least a part of the particles in this layer is fixed to the surface of the porous substrate, so that the whole part in the layered form is fixed (integrated) to the porous substrate.

That the particles exist in the form of an aggregate can be confirmed by observing the separator surface (adhesive layer surface) using a scanning electron microscope (SEM).

The structure of the adhesive layer according to the invention is not particularly limited, as long as the adhesive layer has sufficient ion permeability. From the viewpoint of ion permeability, it is preferable that the adhesive layer has a multipored structure. A multipored adhesive layer is also referred to as an adhesive porous layer.

Further, it is preferable that the particles including a polyvinylidene fluoride resin retain their particle shape in the adhesive layer.

The expression "retain their particle shape" used herein refers to the state in which the particle interface of the particles that include a polyvinylidene fluoride resin can be recognized, when the separator for a non-aqueous secondary battery of the invention is observed by, for example, a scanning electron microscope.

In the invention, the average particle diameter of the particles of a polyvinylidene fluoride resin is preferably from 0.01 μm to 1 μm, more preferably from 0.02 μm to 1 μm, and particularly preferably from 0.05 μm to 1 μm.

When the average particle diameter of the particles is 0.01 μm or more, the separator for a non-aqueous secondary battery may have excellent slipping property and handling property. Further, when the average particle diameter is 1 μm or less, it is easy to form a uniform, thin adhesive layer.

In the invention, the mass of the particles per one adhesive layer is in a range of from 0.1 g/m$^2$ to 6.0 g/m$^2$, and preferably in a range of from 1.0 g/m$^2$ to 3.0 g/m$^2$.

When the mass of the particles per one adhesive layer is 0.1 g/m$^2$ or more, the adhesive property between the separator and an electrode is enhanced. When the mass of the particles per one adhesive layer is 6.0 g/m$^2$ or less, ions easily permeate the separator, and the load characteristics of a battery can be improved.

The adhesive layer may be provided on one side of the porous substrate, or may be provided on both sides of the porous substrate.

The adhesive layer is a layer that bonds to an electrode, when such a layer with an electrolyte contained therein is subjected to compression bonding or heat pressing. The case in which the separator is bonded to both the positive electrode and the negative electrode is preferable, from the viewpoint of cycle life. Thus, it is preferable that the adhesive layer is provided on both sides of the porous substrate.

In a case in which the adhesive layer is formed on both sides of the porous substrate, the total mass of the particles in the adhesive layers on both sides is preferably from 0.2 $g/m^2$ to 12.0 $g/m^2$, and more preferably from 2.0 $g/m^2$ to 6.0 $g/m^2$.

In a case in which the adhesive layer is formed on both sides of the porous substrate, the difference in mass of the particles between the front side and backside of the porous substrate is also important. In the invention, it is preferable that the difference (|a−b|) between the mass (a) of the particles in one adhesive layer and the mass (b) of the particles in the other adhesive layer is 20% or less [(|a−b|× 100/(a+b)≤20% by mass] of the total mass (a+b). When the difference (|a−b|) is 20% or less, curling of the separator can be suppressed, the handling property of the separator can be improved, and deterioration in cycle characteristics can be suppressed.

Note that, the thickness of the adhesive layer is preferably from 0.1 μm to 10 μm on one side.

[Polyvinylidene Fluoride Resin]

Examples of the polyvinylidene fluoride resin in the invention include homopolymers of vinylidene fluoride, that is, polyvinylidene fluoride, and copolymers of vinylidene fluoride and another monomer that is copolymerizable with the vinylidene fluoride. The polyvinylidene fluoride resin may be used together with another polymer, and the adhesive layer may contain, for example, a mixture of polyvinylidene fluoride and an acrylic polymer, a mixture of a polyvinylidene fluoride copolymer and an acrylic polymer, or a mixture thereof.

Examples of the monomer that is copolymerizable with vinylidene fluoride include tetrafluoroethylene, hexafluoropropylene, trifluoroethylene, trichloroethylene, vinyl fluoride, (meth)acrylic acid, (meth)acrylic acid ester such as methyl(meth)acrylate or ethyl(meth)acrylate, vinyl acetate, vinyl chloride, and acrylonitrile. These monomers may be used singly or in combination of two or more thereof.

Examples of the acrylic polymer include polyacrylic acid, a polyacrylic acid salt, a crosslinked polyacrylic acid, a crosslinked polyacrylic acid ester, a polymethacrylic acid ester, a crosslinked polymethacrylic acid, and a crosslinked polymethacrylic acid ester.

Particularly, as the polyvinylidene fluoride resin, it is preferable to use polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, or a mixture of a polyvinylidene fluoride copolymer and an acrylic polymer.

In the invention, it is preferable that the polyvinylidene fluoride resin is a copolymer that includes structural units derived from vinylidene fluoride in an amount of 50 mol % or more, with respect to the total structural units. When the separator includes a polyvinylidene fluoride resin that includes structural units derived from vinylidene fluoride in an amount of 50 mol % or more, even after the separator and electrodes are joined together by compression bonding or heat pressing, the adhesive layer can ensure sufficient dynamic physical properties.

Generally, it is known that, in non-aqueous secondary batteries, the oxidation resistance of a positive electrode has influence on the durability of the battery. However, since polyvinylidene fluoride resins have a high oxygen index and a high oxidation resistance, by using the separator for a non-aqueous secondary battery of the invention, it is possible to improve the durability of a non-aqueous secondary battery. From this point of view, it is preferable that the particles including a polyvinylidene fluoride resin are present in the adhesive layer.

The oxidation resistance of a separator can be examined by disassembling a battery that has been repeatedly charged and discharged, and observing the surface of the separator. Generally, when a separator has a low oxidation resistance, the separator surface may be colored black or brown, and when a separator has an excellent oxidation resistance, the separator surface is not colored.

In the invention, the weight average molecular weight (Mw) of the polyvinylidene fluoride resin is not particularly limited, but is preferably from $1\times10^3$ to $5\times10^6$, more preferably from $1\times10^4$ to $2\times10^6$, and still more preferably from $5\times10^4$ to $1\times10^6$. The terminal structure of the polyvinylidene fluoride resin or a catalyst for polymerization to produce the polymer can be arbitrary selected.

Here, the weight average molecular weight (Mw) of the polyvinylidene fluoride resin can be determined by gel permeation chromatography (GPC method), or the like.

The polyvinylidene fluoride resin according to the invention can be obtained preferably by emulsion polymerization or suspension polymerization, and particularly preferably by emulsion polymerization.

[Filler]

The adhesive layer according to the invention includes a filler that includes at least one of an organic compound or an inorganic compound.

As the filler, either of an organic filler or inorganic filler, which is stable with respect to non-aqueous electrolytes and is electrochemically stable, can be used. By including such a filler in an amount of from 20% by mass to 80% by mass, with respect to the total mass of the particles and the filler (the first exemplary embodiment of the invention), or by the volume of the filler being from 15% by volume to 90% by volume, with respect to the total volume of the volume of the particles and the volume of the filler (the second exemplary embodiment of the invention), the ion permeability can be significantly improved while ensuring the adhesive property between the separator and the electrode. Further, as another effect, it is possible to improve the slipping property of the separator. In the case of further adding safety of a battery, it is preferable to use a filler having a heat resistance temperature of 150° C. or higher.

It is possible that the content of the filler in the adhesive layer is from 20% by mass to 80% by mass, with respect to the total mass of the particles and the filler, and the volume of the filler is from 15% by volume to 90% by volume, with respect to the total volume of the volume of the particles and the volume of the filler.

Examples of the organic filler include various crosslinked polymer particles of a crosslinked polyacrylic acid, a crosslinked polyacrylic acid ester, a crosslinked polymethacrylic acid, a crosslinked polymethacrylic acid ester, a crosslinked polymethyl methacrylate, a crosslinked polysilicone (polymethylsilsesquioxane or the like), a crosslinked polystyrene, a crosslinked polydivinylbenzene, a crosslinked product of a styrene-divinylbenzene copolymer, polyimide, a melamine resin, a phenol resin, a benzoguanamine-formaldehyde condensate, or the like; and heat resistant polymer particles of polysulfone, polyacrylonitrile, aramide, polyacetal, thermoplastic polyimide, or the like. The organic resin (polymer) that is a component of the organic particles may be a mixture, a modified product, a derivative, a copolymer (a random copolymer, an alternating copolymer, a block copolymer, or a graft copolymer), or a crosslinked product (in the case of the heat resistant polymer described above) of the material exemplified above.

Among them, one or more kinds of resins selected from the group consisting of a crosslinked polyacrylic acid, a crosslinked polyacrylic acid ester, a crosslinked polymethacrylic acid, a crosslinked polymethacrylic acid ester, a crosslinked polymethyl methacrylate, and a crosslinked polysilicone (polymethylsilsesquioxane or the like) are preferable.

Examples of the inorganic filler include metal hydroxides such as aluminium hydroxide, magnesium hydroxide, calcium hydroxide, chromium hydroxide, zirconium hydroxide, nickel hydroxide, or boron hydroxide; metal oxides such as alumina or zirconia; carbonates such as calcium carbonate or magnesium carbonate; sulfates such as barium sulfate or calcium sulfate; clay minerals such as calcium silicate or talc, and the like.

Among them, an inorganic filler formed of at least one of a metal hydroxide or a metal oxide is preferable. Particularly, it is preferable to use a metal hydroxide, from the viewpoint of imparting flame resistance or an effect of electricity removal. Note that, the fillers described above may be used singly or in combination of two or more thereof.

Among the fillers described above, magnesium hydroxide is preferable. An inorganic filler that is surface-modified with a silane coupling agent or the like can also be used.

The average particle diameter of the filler is preferably from 0.01 μm to 10 μm, from the viewpoints of favorable adhesive property between the separator and an electrode, ion permeability, ensuring of slipping property, and forming property of a separator. The lower limit thereof is more preferably 0.1 μm or more, and the upper limit thereof is more preferably 5 μm or less. Further, the average particle diameter of the filler is preferably from 0.5 μm to 2 μm.

The shape of the filler may be, for example, a shape near globular shape, or may be a plate-like shape; however, in view of short circuit prevention, plate-like particles or primary particles that are not aggregated are preferable.

When the filler is incorporated, for example, in the adhesive layer, the separator surface may be roughened, and by realizing roughening, the filler can exhibit a function of improving the slipping property of the separator surface. In a case in which the filler has a plate-like shape, or in a case in which the filler is primary particles that are not aggregated, even if the separator surface is roughened by the filler, the unevenness of the surface can be leveled, and thus, it is possible to maintain the uniformity of the surface. In addition, by using, as the filler, plate-like particles or primary particles that are not aggregated, the surface roughness of the separator surface in the interface between the separator and an electrode (at least one of a positive electrode or a negative electrode) becomes uniform, so that it is advantageous in that the adhesive property is not damaged.

In the first exemplary embodiment of the invention, the mass of the filler [100×Wf/(Wp+Wf)] relative to the total mass (Wp+Wf) of the mass of the polyvinylidene fluoride resin (Wp) and the mass of the filler (Wf) is from 20% by mass to 80% by mass.

When the content of the filler is 20% by mass or more, the surface of the adhesive layer is roughened and the contact area is reduced, and thus, together with an effect of improving the slipping property, the ion permeability improves dramatically. From this point of view, the content of the filler is more preferably 30% by mass or more. Further, when the content of the filler is 80% by mass or less, the adhesion to electrode is favorable, and embrittlement of the separator is prevented, and thus, for example, when at least one of a positive electrode or a negative electrode and the separator are stacked together to form a wound electrode body, there is no concern for occurrence of a problem with the separator, such as breakage. From this point of view, the content of the filler is more preferably 70% by mass or less.

Further, from the viewpoint of volume percentage according to the second exemplary embodiment of the invention, regarding the filler in the adhesive layer, the volume of the filler [100×Vf/(Vp+Vf)] relative to the total volume (Vp+Vf) of the volume of the polyvinylidene fluoride resin (Vp) and the volume of the filler (Vf) is 15% by volume or more, and preferably 30% by volume or more.

The volume of the filler [100×Vf/(Vp+Vf)] is 90% by volume or less, and preferably 70% by volume or less.

The volume proportion (% by volume) of the filler in the adhesive layer can be calculated according to the following equation.

Volume proportion of filler $Vf$ (% by volume)=[Volume per unit area of filler/(Volume per unit area of adhesive layer)]×100

The volume per unit area of the filler ($cm^3/m^2$) in the above equation is obtained by dividing the mass of the filler per unit area of the adhesive layer ($g/m^2$) by the specific gravity of the filler ($g/cm^3$). The volume per unit area of the adhesive layer ($cm^3/m^2$) is obtained by multiplying the thickness of the adhesive layer by the unit area. Here, the mass of the filler in the adhesive layer can be determined from the mass per unit area (weight per unit area) of the adhesive layer and the percentage of filler content in the composition of the adhesive layer. Further, the mass of the filler in the adhesive layer can also be determined by thermogravimetry analysis (TGA).

As described above, by the use of a filler having a heat resistance temperature of 150° C. or higher, safety of a battery can be added. Note that, the term "heat resistance temperature" refers to the temperature at which transformation (for example, shrinkage) or a change in characteristic occurs, when the object to be heated is heated.

From the viewpoint of improving the heat resistance of the separator, it is preferable to use an inorganic filler as the filler, and it is preferable to increase the content of the inorganic filler in the adhesive layer. Specifically, when the mass of the filler [100×Wf1/(Wp+Wf1)] relative to the total mass (Wp+Wf1) of the mass of the polyvinylidene fluoride resin (Wp) and the mass of the inorganic filler (Wf1) is 20% by mass or more, the heat resistance of the separator can be enhanced. It is more preferable that the mass of the filler [100×Wf1/(Wp+Wf1)] is 30% by mass or more.

Further, with regard to the content of the inorganic filler in the adhesive layer, the volume of the inorganic filler [100×Vf1/(Vp+Vf1)] relative to the total volume (Vp+Vf1) of the volume of the polyvinylidene fluoride resin (Vp) and the volume of the inorganic filler (Vf1) is preferably 15% by volume or more, and more preferably 30% by volume or more.

The heat resistance of the separator can be examined, for example, by measuring the thermal shrinkage percentage of the separator when heating the separator. When the separator of the invention includes an inorganic filler as the filler, the thermal shrinkage percentage of the separator can be reduced.

From the viewpoint of suppressing embrittlement of the adhesive layer, the mass of the filler [100×Wf1/(Wp+Wf1)] is preferably 80% by mass or less, and more preferably 70% by mass or less.

From the same viewpoint, the volume of the inorganic filler [100×Vf1/(Vp+Vf1)] is preferably 85% by volume or less, and more preferably 70% by volume or less.

Among the inorganic fillers, silica, magnesium hydroxide, magnesium oxide, and alumina are preferable from the viewpoint of improvement in heat resistance of the separator.

[Physical Properties of Separator for Non-Aqueous Secondary Battery]

In the invention, the Gurley value of the separator is preferably 300 sec/100 cc or less, from the viewpoint of ion permeability.

The film thickness of the separator for a non-aqueous secondary battery is preferably 30 μm or less, and more preferably 20 μm or less. When the film thickness of the separator is 30 μm or less, reduction in the energy density of a battery and lowering of output characteristics can be prevented.

The membrane resistance of the separator for a non-aqueous secondary battery is preferably from 0.5 ohm·cm$^2$ to 10 ohm·cm$^2$, and more preferably from 1 ohm·cm$^2$ to 8 ohm·cm$^2$.

The puncture resistance of the separator for a non-aqueous secondary battery is preferably in a range of from 10 g to 1,000 g, and more preferably in a range of from 200 g to 600 g.

<Method for Manufacturing Separator for Non-Aqueous Secondary Battery>

The method for manufacturing the separator for a non-aqueous secondary battery is not particularly limited, as long as the method is capable of manufacturing a separator for a non-aqueous secondary battery that has an adhesive layer on one side or both sides of a porous substrate, in which the adhesive layer includes an aggregate of particles and a filler each in an amount described above.

However, from the viewpoint of more efficiently manufacturing the separator for a non-aqueous secondary battery of the invention, the following method is preferable.

The method for manufacturing a separator for a non-aqueous secondary battery of the invention is a method of manufacturing the above-described separator for a non-aqueous secondary battery of the invention, the method including a coating process of coating, on one side or both sides of a porous substrate, a water-based dispersion including particles that include a polyvinylidene fluoride resin, and a filler that includes at least one of an organic compound or an inorganic compound, and a drying process of drying the coated water-based dispersion.

Since the method for manufacturing a separator for a non-aqueous secondary battery of the invention has the configuration described above, the separator for a non-aqueous secondary battery of the invention can be manufactured by vaporizing the solvent of the water-based dispersion. Accordingly, any equipment for handling organic solvents such as acetone, which is generally used for the manufacture of a separator, is not required, and thus, separator production cost can be reduced. Therefore, the separator can be manufactured with high productivity.

[Coating Process]

In the coating process, a water-based dispersion including particles that include a polyvinylidene fluoride resin, and a filler that includes at least one of an organic compound or an inorganic compound, in which the content of the filler is from 20% by mass to 80% by mass with respect to the total mass of the particles and the filler, is coated on one side or both sides of a porous substrate, such that the amount of the particles is from 0.1 g/m$^2$ to 6.0 g/m$^2$ per one layer.

[Water-Based Dispersion]

First, a water-based dispersion is prepared by dispersing or suspending, in the solid state, or emulsifying the particles that include a polyvinylidene fluoride resin, and the filler that includes at least one of an organic compound or an inorganic compound, each in a solvent. The obtained water-based dispersion is the coating liquid to be coated on a porous substrate. The water-based dispersion may be an emulsion, or may be a suspension.

As the solvent of the water-based dispersion, at least water is used, and further, a solvent other than water may be added.

The solvent other than water is not particularly limited, as long as the solvent does not dissolve the polyvinylidene fluoride resin and the filler and can disperse or suspend the polyvinylidene fluoride resin and the filler, in the solid state, or can emulsify the polyvinylidene fluoride resin and the filler. Examples include organic solvents such as alcohols such as methanol, ethanol, or 2-propanol, acetone, tetrahydrofuran, methyl ethyl ketone, ethyl acetate, N-methylpyrrolidone, dimethylacetamide, dimethylformamide, or dimethylformamide.

The term "water-based emulsion" used in the invention refers to an emulsion obtained by emulsifying the particles including a polyvinylidene fluoride resin and the filler in water or in a mixed liquid of water and the above organic solvent.

From the environmental, safety, and economic point of view, it is preferable to use a water-based emulsion obtained by emulsifying the particles including a polyvinylidene fluoride resin and the filler in water or in a mixed liquid of water and alcohol.

The composition of the water-based dispersion may be any composition that includes water, the particles, and the filler; however, it is preferable that the content of the filler is from 20% by mass to 80% by mass, with respect to the total mass of the particles and the filler, or the volume of the filler relative to the total volume of the volume of the particles and the volume of the filler is from 15% by volume to 90% by volume.

Further, a known thickener may further be added to the water-based dispersion within a range in which a viscosity suitable for coating can be ensured, or a known surfactant may be added in order to enhance the dispersibilities of the particles and the filler in the water-based dispersion.

It is preferable that the content of the particles that include a polyvinylidene fluoride resin, in the water-based dispersion is in a range of from 1% by mass to 50% by mass, with respect to the total mass of the water-based dispersion. By adjusting the concentration of the particles, the mass of the particles including a polyvinylidene fluoride resin, which are present in the separator for a non-aqueous secondary battery, can be adjusted.

For coating the water-based dispersion onto a porous substrate (for example, a polyolefin microporous membrane), it is possible to apply a conventional coating system, for example, a Mayer bar, a die coater, a reverse roll coater, a gravure coater, a microgravure coater, spray coating, or the like. In the case of fixing the particles that include a polyvinylidene fluoride resin, to both front and back sides of the porous substrate, the water-based dispersion may be coated on one side, then on the other side, and then subjected to drying. From the viewpoint of productivity, it is preferable that the water-based dispersion is coated simultaneously on both sides of the porous substrate, followed by drying the water-based dispersion.

[Drying Process]

In the drying process, the water-based dispersion that has been coated on a porous substrate in the coating process is dried.

By drying the water-based dispersion that has been coated on at least one side of a porous substrate (for example, a polyolefin microporous membrane), an adhesive layer including an aggregate of the particles that include a polyvinylidene fluoride resin, and the filler is formed, while vaporizing the solvent of the water-based dispersion.

It is preferable that the particles that include a polyvinylidene fluoride resin, in the adhesive layer obtained through the drying process, retain their particle shape. By performing the drying process, the polyvinylidene fluoride resin particles function as the binder, and the whole adhesive layer is in the state of being integrally formed on a porous substrate such as a polyolefin microporous membrane.

<Non-Aqueous Secondary Battery>

The non-aqueous secondary battery of the invention is equipped with the separator of the invention.

Specifically, the non-aqueous secondary battery of the invention is equipped with a positive electrode, a negative electrode, and the separator for a non-aqueous secondary battery of the invention, which is disposed between the positive electrode and the negative electrode, wherein in the non-aqueous secondary battery, electromotive force is obtained by lithium doping/dedoping.

In the invention, in the non-aqueous secondary battery, the separator is disposed between the positive electrode and the negative electrode, and such a battery element is enclosed in an outer casing together with an electrolyte. A lithium ion secondary battery is suitable as the non-aqueous secondary battery.

Note that, the term "dope" means occlusion, support, adsorption, or insertion, and means a phenomenon in which a lithium ion enters into an active material of an electrode such as a positive electrode or the like.

The positive electrode may have a structure in which an active material layer containing a positive electrode active material and a binder resin is formed on a current collector. The active material layer may further contain an electrically conductive additive.

Examples of the positive electrode active material include lithium-containing transition metal oxides. Specific examples include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCO_{1/2}Ni_{1/2}O_2$, and $LiAl_{1/4}Ni_{3/4}O_2$.

Examples of the binder resin include polyvinylidene fluoride resins.

Examples of the electrically conductive additive include carbon materials such as acetylene black, KETJENBLACK, or graphite powder.

Examples of the current collector include an aluminum foil, a titanium foil, and a stainless steel foil, each having a thickness of from 5 μm to 20 μm.

In the non-aqueous electrolyte battery of the invention, in a case in which the adhesive porous layer of the separator is disposed on the positive electrode side, since the polyvinylidene fluoride resin has excellent oxidation resistance, a positive electrode active material which can be operated at a high voltage of 4.2 V or more, such as $LiMn_{1/2}Ni_{1/2}O_2$ or $LiCo_{1/3}Mn_{1/3}Ni_{1/3}O_2$, can be easily applied, which is thus advantageous.

The negative electrode may have a structure in which an active material layer containing a negative electrode active material and a binder resin is formed on a current collector. The active material layer may further contain an electrically conductive additive.

Examples of the negative electrode active material include materials capable of electrochemically occluding lithium. Specific examples include carbon materials, and alloys of lithium and silicon, tin, aluminium, or the like.

Examples of the binder resin include polyvinylidene fluoride resins and styrene-butadiene rubbers. In the case of using a styrene-butadiene rubber as the negative electrode binder, the separator of the invention can ensure sufficient adhesive property with respect to the negative electrode.

Examples of the electrically conductive additive include carbon materials such as acetylene black, KETJENBLACK, or graphite powder.

Examples of the current collector include a copper foil, a nickel foil, and a stainless steel foil, each having a thickness of from 5 μm to 20 μm.

Further, instead of using the negative electrode described above, a metal lithium foil may be used as the negative electrode.

In the electrode, it is preferable that the active material layer contains a large amount of binder resin, from the viewpoint of adhesion to a separator. Meanwhile, from the viewpoint of increasing the energy density of a battery, it is preferable that the active material layer contains a large amount of active material, and it is preferable that the amount of binder resin is relatively smaller.

Since the separator of the invention has excellent adhesion to electrodes, it is possible to reduce the amount of binder resin that is a component of the active material layer of the electrode and to increase the amount of active material, so that the energy density of a battery can be increased.

The electrolyte is a solution obtained by dissolving a lithium salt in a non-aqueous solvent.

Examples of the lithium salt include $LiPF_6$, $LiBF_4$, and $LiClO_4$.

Examples of the non-aqueous solvent include cyclic carbonates such as ethylene carbonate, propylene carbonate, fluoroethylene carbonate, or difluoroethylene carbonate; chain carbonates such as dimethyl carbonate, diethyl carbonate, ethyl methyl carbonate, or a fluorine substitution product thereof; cyclic esters such as γ-butyrolactone or γ-valerolactone; and the like. These non-aqueous solvents may be used singly or in mixture.

As the electrolyte, a solution is preferred, which is obtained by mixing cyclic carbonate and chain carbonate at a mass ratio (cyclic carbonate/chain carbonate) of from 20/80 to 40/60, and dissolving a lithium salt in the resulting mixed solvent to give a concentration of from 0.5 M to 1.5 M.

In a separator equipped with a conventional adhesive porous layer, there are cases in which adhesive property with respect to electrodes is hardly exhibited depending on the kind of electrolyte used. However, the separator of the invention is advantageous in that favorable adhesive property can be exhibited, regardless of the kind of electrolyte.

Examples of the outer casing material include a metal can and a pack made of aluminum laminate film. Examples of the shape of a battery include a square type, a cylindrical type, and a coin type. The separator of the invention is suitable for any shape.

Since the separator of the invention has excellent adhesion to electrodes, a space is hardly formed between the electrode and the separator, even if impact from the outside is applied or expansion/shrinkage of the electrode occurs during charging and discharging. Thus, the separator of the invention is suitable for use in a soft pack battery having a pack made of aluminum laminate film as the outer casing material. Therefore, according to the separator of the invention, a soft pack battery having high battery performance can be provided.

The non-aqueous electrolyte battery of the invention can be manufactured, for example, by the following method. Namely, the separator of the invention is disposed between a positive electrode and a negative electrode to prepare a laminated body. Then, this laminated body is impregnated with an electrolyte and housed in an outer casing material (for example, a pack made of aluminum laminate film). Then, the laminated body is pressed from above the outer casing material, to produce a battery.

According to the manufacture method described above, the electrodes and the separator can favorably bond to each other, and thus a non-aqueous electrolyte battery having an excellent cycle life can be obtained. In addition, because of the favorable adhesive property between the electrodes and the separator, a battery further having excellent safety may be obtained.

A system of disposing a separator between a positive electrode and a negative electrode may be a system of layering a positive electrode, a separator, and a negative electrode on one another, each by at least one layer, in this order (a so-called stack system) or may be a system in which a positive electrode, a separator, a negative electrode, and a separator are stacked together in this order and wound in the direction of the length.

EXAMPLES

Hereinafter, the present invention is described with reference to Examples. However, it should be construed that the invention is by no means limited to the following Examples.

[Measurement Method]

(Method of Measuring Average Particle Diameter of Particles Including Polyvinylidene Fluoride Resin)

Measurement was conducted using a laser diffraction particle size analyzer. Water was used as the dispersion medium, and the median particle diameter (D50) in the volume particle size distribution was designated as the average particle diameter.

(Method of Measuring Film Thickness)

The film thickness of the separator was measured using a contact thickness meter (LITEMATIC, manufactured by Mitutoyo Corporation). The measurement was carried out using a cylindrical measuring terminal having a diameter of 5 mm, with adjustment so that a load of 7 g was applied during the measurement, and the average value of the thicknesses of 20 points was determined.

(Weight Per Unit Area)

The separator was cut into a 10 cm×30 cm piece, and the mass of the piece was measured. The mass was divided by the area, to determine the weight per unit area.

Further, the volume percentage of the filler content was determined from the following equation.

Volume proportion of filler (% by volume)=[Volume per unit area of filler (cm$^3$/m$^2$)/(Volume per unit area of adhesive layer (cm$^3$/m$^2$))]×100

In the above equation, the volume per unit area of the adhesive layer (cm$^3$/m$^2$) was determined by multiplying the thickness of the adhesive layer by the unit area. The volume per unit area of the filler (cm$^3$/m$^2$) was obtained by dividing the mass of the filler per unit area of the adhesive layer (g/m$^2$) by the specific gravity of the filler (g/cm$^3$). The mass of the filler in the adhesive layer was determined from the mass per unit area (weight per unit area) of the adhesive layer and the percentage of filler content in the composition of the adhesive layer.

(Mass of Particles Including Polyvinylidene Fluoride Resin)

By subtracting the weight per unit area of the substrate from the weight per unit area of the separator, the total mass of the filler and the particles including a polyvinylidene fluoride resin was obtained, and thereafter, from the amount of charge, the mass of the particles including a polyvinylidene fluoride resin was calculated.

[Test of Adhesive Property Between Separator and Electrode]

The positive electrode and the negative electrode were joined together via the separator and these were impregnated with an electrolyte, and the battery element was enclosed in an aluminum laminate pack by using a vacuum sealer, to produce a test cell. Here, 1 M LiPF$_6$ ethylene carbonate/ethyl methyl carbonate (3/7 mass ratio) was used as the electrolyte. This test cell was subjected to pressing using a heat press machine. Thereafter, the cell was disassembled and the peel strength was measured, whereby the adhesive property was evaluated. The pressing condition was such a condition that a load of 20 kg per 1 cm$^2$ of electrode was applied, and the temperature and the time period were set at 90° C. and 2 minutes, respectively.

The average value of the peel strengths with respect to the positive electrode and the negative electrode for each separator was relatively evaluated, taking the average value of the peel strengths with respect to the positive electrode and the negative electrode for the separator of Example 1 as 100. The one in which the average value of the peel strengths is 70 or more is rated as A (favorable), the one in which the average value of the peel strengths is 50 or more but less than 70 is rated as B (mostly favorable), the one in which the average value of the peel strengths is less than 50 is rated as C (unfavorable).

(Gurley Value)

The Gurley value of the separator was measured in accordance with JIS P8117, using a Gurley densometer (G-B2C, manufactured by Toyo Seiki Co., Ltd.).

Example 1

VINYCOAT PVDF AQ360 (manufactured by HIGASHI NIPPON TORYO CO., LTD.) was used as a water-based emulsion that includes particles including a polyvinylidene fluoride resin. This emulsion was diluted, to prepare a water-based dispersion having a particle concentration of 7.4% by mass. Further, a magnesium hydroxide filler (KISUMA 5P, manufactured by Kyowa Chemical Industry Co., Ltd.) having an average particle diameter of 880 nm was dispersed in the above water-based dispersion, to prepare a coating liquid (water-based dispersion). In the coating liquid, the content of the filler with respect to the total mass of the filler and the particles including a polyvinylidene fluoride resin was adjusted to 20% by mass. The average particle diameter of the particles including a polyvinylidene fluoride resin is 250 nm, and the resin is a vinylidene fluoride-acryl copolymer (vinylidene fluoride 70 mol %).

Equal amounts of the obtained coating liquid were coated respectively on both sides of a polyethylene microporous membrane having a film thickness of 9 μm, a Gurley value of 160 sec/100 cc, and a porosity of 43%, using a bar coater #6, manufactured by Daiichi Rika Co., Ltd., followed by drying at 60° C.

In this way, a separator for a non-aqueous secondary battery according to the invention, having an adhesive layer that includes an inorganic filler and an aggregate of particles including a polyvinylidene fluoride resin, formed integrally on both sides of a polyethylene microporous membrane was obtained.

With regard to the obtained separator, the average particle diameter A of the particles including a polyvinylidene fluoride resin, the average particle diameter B of the filler, the filler content, the mass (coating amount) of the whole adhesive layer, the mass of the particles (coating amount of PVDF), the coating amount of the particles per one layer, the film thickness and Gurley value of the separator, and the adhesive property between the separator and the electrodes are summarized in Table 1. Also with regard to the separators of Examples and Comparative Examples described below, the measurement results are summarized in Table 1.

Example 2

A separator for a non-aqueous secondary battery according to the invention was obtained in the same manner as in Example 1, except that the content of the filler in the coating liquid was changed to 40% by mass.

Example 3

A separator for a non-aqueous secondary battery according to the invention was obtained in the same manner as in Example 1, except that the content of the filler in the coating liquid was changed to 60% by mass.

Example 4

A separator for a non-aqueous secondary battery according to the invention was obtained in the same manner as in Example 1, except that the filler was changed to polymethylsilsesquioxane particles MSP-N050, manufactured by NIKKO RICA CORPORATION, which have an average particle diameter of 500 nm.

Example 5

A separator for a non-aqueous secondary battery according to the invention was obtained in the same manner as in Example 4, except that the content of the filler in the coating liquid was changed to 40% by mass.

Example 6

A separator for a non-aqueous secondary battery according to the invention was obtained in the same manner as in Example 4, except that the content of the filler in the coating liquid was changed to 60% by mass.

Example 7

A separator for a non-aqueous secondary battery according to the invention was obtained in the same manner as in Example 4, except that the content of the filler in the coating liquid was changed to 80% by mass.

Example 8

A separator for a non-aqueous secondary battery according to the invention was obtained in the same manner as in Example 2, except that the filler was changed to a cross-linked acrylic acid resin filler (MX-180TA, manufactured by Soken Chemical & Engineering Co., Ltd.), which has an average particle diameter of 1.8 μm.

Example 9

A separator for a non-aqueous secondary battery according to the invention was obtained in the same manner as in Example 8, except that the content of the filler in the coating liquid was changed to 60% by mass.

Example 10

A separator for a non-aqueous secondary battery according to the invention was obtained in the same manner as in Example 8, except that the content of the filler in the coating liquid was changed to 80% by mass.

Example 11

A separator for a non-aqueous secondary battery according to the invention was obtained in the same manner as in Example 1, except that a polyolefin microporous membrane (M824, manufactured by Celgard LLC), which has a three-layer structure of polypropylene/polyethylene/polypropylene and has a film thickness of 12 μm, a Gurley value of 425 sec/100 cc, and a porosity of 38%, was used as the polyolefin microporous membrane.

Example 12

A separator for a non-aqueous secondary battery according to the invention was obtained in the same manner as in Example 1, except that the content of the filler in the coating liquid was changed to 50% by mass, and a bar coater #4, manufactured by Daiichi Rika Co., Ltd., was used.

Example 13

A separator for a non-aqueous secondary battery according to the invention was obtained in the same manner as in Example 1, except that the content of the filler in the coating liquid was changed to 50% by mass, and a bar coater #15, manufactured by Daiichi Rika Co., Ltd., was used.

Comparative Example 1

A separator for a non-aqueous secondary battery was obtained in the same manner as in Example 1, except that the filler was not added.

Comparative Example 2

A separator for a non-aqueous secondary battery was obtained in the same manner as in Example 8, except that the content of the filler in the coating liquid was changed to 10% by mass.

Comparative Example 3

A separator for a non-aqueous secondary battery was obtained in the same manner as in Example 8, except that the content of the filler in the coating liquid was changed to 90% by mass. The obtained separator was such a separator that the filler extremely easily fell off from the layer formed from the particles and the filler.

Comparative Example 4

A separator for a non-aqueous secondary battery was obtained in the same manner as in Example 1, except that the content of the filler in the coating liquid was changed to 50% by mass, and a bar coater #2, manufactured by Daiichi Rika Co., Ltd., was used.

Comparative Example 5

A separator for a non-aqueous secondary battery was obtained in the same manner as in Example 1, except that the content of the filler in the coating liquid was changed to 50% by mass, and a bar coater #17, manufactured by Daiichi Rika Co., Ltd., was used.

electrically conductive additive, and polyvinylidene fluoride as a binder were dissolved in NMP such that the content of the polyvinylidene fluoride was 6% by mass, and the obtained solution was stirred using a double-arm mixer such that the mass of the polyvinylidene fluoride was 6% by mass, thereby preparing a slurry for a positive electrode. This slurry for a positive electrode was coated on an aluminum foil having a thickness of 20 μm as a positive electrode current collector, and the resulting coated membrane was dried, followed by pressing, to produce a positive electrode having a positive electrode active material layer.

(Production of Battery)

A lead tab was welded to each of the positive electrode and negative electrode produced as described above. Then, the positive electrode and the negative electrode were joined

TABLE 1

| | | Adhesive layer | | | | | | | | |
|---|---|---|---|---|---|---|---|---|---|---|
| | | Filler | | | PVDF Particles | | | | Separator | |
| | | | | | | Coating | | | | |
| | | Average Particle Diameter | Content | | Average Particle Diameter | Coating Amount | Amount per One Layer | Whole Coating | Film Thickness | Gurley Value | Adhesive Property |
| | Kind | B nm | % by mass | % by volume | A nm | Amount g/m² | g/m² | Amount g/m² | μm | s/100 cc | — |
| Example 1 | KISUMA 5P | 880 | 20 | 16 | 250 | 1.2 | 0.6 | 1.5 | 10.7 | 273 | A |
| Example 2 | KISUMA 5P | 880 | 40 | 33 | 250 | 1.2 | 0.6 | 2 | 11.4 | 215 | A |
| Example 3 | KISUMA 5P | 880 | 60 | 53 | 250 | 0.8 | 0.4 | 2 | 14.3 | 188 | A |
| Example 4 | MSP-N050 | 500 | 20 | 26 | 250 | 1.2 | 0.6 | 1.5 | 11.1 | 384 | A |
| Example 5 | MSP-N050 | 500 | 40 | 48 | 250 | 1 | 0.5 | 1.6 | 10.5 | 211 | A |
| Example 6 | MSP-N050 | 500 | 60 | 67 | 250 | 0.8 | 0.4 | 2 | 12 | 188 | A |
| Example 7 | MSP-N050 | 500 | 80 | 85 | 250 | 1 | 0.5 | 5 | 15.3 | 190 | A |
| Example 8 | MX-180TA | 1800 | 40 | 50 | 250 | 1.9 | 0.95 | 3.1 | 13.7 | 213 | A |
| Example 9 | MX-180TA | 1800 | 60 | 69 | 250 | 1.5 | 0.75 | 3.7 | 14.4 | 187 | A |
| Example 10 | MX-180TA | 1800 | 80 | 86 | 250 | 1.4 | 0.7 | 7.1 | 19.2 | 185 | A |
| Example 11 | KISUMA 5P | 880 | 20 | 16 | 250 | 1.2 | 0.6 | 1.5 | 14 | 495 | A |
| Example 12 | KISUMA 5P | 880 | 50 | 16 | 250 | 0.2 | 0.1 | 0.3 | 10.3 | 210 | A |
| Example 13 | KISUMA 5P | 880 | 50 | 53 | 250 | 12 | 6 | 15 | 24 | 510 | A |
| Comparative Example 1 | — | — | 0 | 0 | 250 | 1.8 | 0.9 | 1.8 | 10.5 | No gas permeability | A |
| Comparative Example 2 | MX-180TA | 1800 | 10 | 14 | 250 | 1.8 | 0.9 | 2 | 13 | 752 | A |
| Comparative Example 3 | MX-180TA | 1800 | 90 | 93 | 250 | 0.8 | 0.4 | 8 | 22.1 | 185 | C |
| Comparative Example 4 | KISUMA 5P | 880 | 50 | 8 | 250 | 0.18 | 0.09 | 0.2 | 10 | 170 | C |
| Comparative Example 5 | KISUMA 5P | 880 | 50 | 53 | 250 | 12.2 | 6.1 | 30.5 | 30 | 700 | A |

[Production of Battery]

(Production of Negative Electrode)

300 g of artificial graphite as a negative electrode active material, 7.5 g of a water-soluble dispersion including a modified form of a styrene-butadiene copolymer in an amount of 40% by mass as a binder, 3 g of carboxymethyl cellulose as a thickener, and a proper quantity of water were stirred using a double-arm mixer, thereby preparing a slurry for a negative electrode. This slurry for a negative electrode was coated on a copper foil having a thickness of 10 μm as a negative electrode current collector, and the resulting coated membrane was dried, followed by pressing, to produce a negative electrode having a negative electrode active material layer.

(Production of Positive Electrode)

89.5 g of lithium cobalt oxide powder as a positive electrode active material, 4.5 g of acetylene black as an together via the respective separators produced in the above Examples and Comparative Examples, and the thus obtained product was impregnated with an electrolyte, and enclosed in an aluminum pack using a vacuum sealer. Here, 1 M LiPF$_6$ ethylene carbonate/ethyl methyl carbonate (3/7 mass ratio) was used as the electrolyte. This aluminum pack was subjected to heat pressing using a heat press machine at 90° C. for 2 minutes, while applying a load of 20 kg per 1 cm² of electrode. In this way, a test battery was produced.

[Handling Property of Separator]

The separators of Examples and Comparative Examples were each cut into a sheet having a size of 100 mm×100 mm, and the obtained sheet was placed on a cross-section paper. The sheet was moved to a marked point 50 cm distance apart, using a pair of tweezers. The ease of movement was ranked out of three (A, B, and C). The sheet was moved only by using a pair of tweezers and was not moved with hands directly. Further, rubber gloves were worn over hands, during working.

—Evaluation Criteria—

A: By holding only one corner, it was possible to move without generating any wrinkles or crimps.

B: When holding only one corner, wrinkles were generated during movement, but when holding two corners at the same time, it was possible to move without generating any wrinkles or crimps.

C: Two corners were held at the same time, but wrinkles were generated during movement.

[Rate Characteristic Test]

Using the non-aqueous secondary battery thus produced, discharge was carried out at 0.5 C and at 2 C. Here, the charge condition was constant-current constant-voltage charge at 1 C and 4.2 V, and the discharge condition was constant-current discharge at 2.75 V cut-off. As the evaluation result, a relative ratio of the discharge capacity when discharging at 2 C to the discharge capacity when discharging at 0.5 C is shown.

[Charge and Discharge Cycle Test (Cycle Characteristic Evaluation)]

Using the non-aqueous secondary battery thus produced, a charge and discharge cycle test was carried.

Evaluation of cycle characteristics was carried out under the following conditions. Namely, the charge condition was constant-current constant-voltage charge at 1 C and 4.2 V, and the discharge condition was constant-current discharge at 1 C and 2.75 V cut-off. Here, the capacity retention ratio after 100 cycles was used as an index of cycle characteristics. The results are shown in Table 2.

[Thermal Shrinkage Percentage Test (Evaluation on Heat Resistance of Separator)]

The separators of Examples and Comparative Examples were each cut to a size of 18 cm (MD direction)×6 cm (TD direction) to obtain a test piece. In an oven at 105° C., the test piece was hanged such that the MD direction corresponded to the gravity direction, and was subjected to a heat treatment for 30 minutes without applying tension. After the heat treatment, the test piece was taken out from the oven, and with regard to each of the MD direction and the TD direction, the thermal shrinkage percentage (%) was calculated according to the following equation.

Thermal shrinkage percentage (%)=[(Length of test piece before heat treatment−Length of test piece after heat treatment)/(Length of test piece before heat treatment)]×100

The results are shown in Table 2. It shows that, the lower the thermal shrinkage percentage is, the more excellent the heat resistance of a separator becomes.

TABLE 2

| | Handling Property | Result of Rate Characteristic Test | Result of Charge and Discharge Cycle Test | Thermal Shrinkage Percentage |
|---|---|---|---|---|
| Example 1 | A | 90% | 92% | 22% |
| Example 2 | A | 93% | 96% | 20% |
| Example 3 | A | 92% | 95% | 10% |
| Example 4 | A | 87% | 95% | 23% |
| Example 5 | A | 91% | 93% | 11% |
| Example 6 | A | 93% | 91% | 1% |
| Example 7 | A | 94% | 91% | 0% |
| Example 8 | A | 91% | 86% | 22% |
| Example 9 | A | 93% | 93% | 20% |
| Example 10 | A | 93% | 93% | 15% |
| Example 11 | A | 87% | 92% | 22% |

TABLE 2-continued

| | Handling Property | Result of Rate Characteristic Test | Result of Charge and Discharge Cycle Test | Thermal Shrinkage Percentage |
|---|---|---|---|---|
| Example 12 | B | 91% | 95% | 27% |
| Example 13 | B | 85% | 85% | 18% |
| Comparative Example 1 | A | 65% | 95% | 28% |
| Comparative Example 2 | B | 75% | 75% | 28% |
| Comparative Example 3 | C | 69% | 60% | 5% |
| Comparative Example 4 | C | 90% | 91% | 27% |
| Comparative Example 5 | C | 70% | 75% | 5% |

With regard to the respective separators of Example 1 to Example 13 and Comparative Example 1 to Comparative Example 5, the moisture was vaporized at 120° C. using a vaporizer (model VA-100, manufactured by Mitsubishi Chemical Analytech Co., Ltd.) and thereafter, the moisture content was measured using a Karl Fischer moisture meter (CA-100, manufactured by Mitsubishi Chemical Co., Ltd.). As a result, all the moisture contents of the separators of Example 1 to Example 13 and Comparative Example 1 to Comparative Example 5 were 1,000 ppm or less.

Comparative Example 6

A battery was produced in the same manner as in Example 1, except that the polyethylene microporous membrane in Example 1 was used as it is, as the separator, and the charge and discharge cycle test was carried out. After the test, the battery was disassembled, and it was revealed that the separator of the Comparative Example was colored black.

Also with regard to Example 1 to Example 13, the batteries after the charge and discharge cycle test were disassembled, and the separators were visually observed. As a result, the separators of Example 1 to Example 13 were not colored, and it was understood that the separators had excellent oxidation resistance.

Reference Example 1

KYNAR2851 (manufactured by ARKEM), that is, a vinylidene fluoride/hexafluoropropylene copolymer, was used as the polyvinylidene fluoride resin. This polyvinylidene fluoride resin was dissolved in an 8% by mass mixed solvent (=DMA/TPG=7/3 [mass ratio]) of dimethylacetamide (DMA) and tripropylene glycol (TPG), to prepare a coating liquid. Equal amounts of this coating liquid were coated respectively on both sides of a polyethylene microporous membrane (film thickness: 9 μm, Gurley value: 160 sec/100 cc, porosity: 43%), followed by immersion in a coagulation liquid (water/dimethylacetamide/tripropylene glycol (=57/30/13 [mass ratio]) mixed liquid) at 10° C., to perform solidification. The resulting membrane was washed with water, followed by drying, to produce a separator for a non-aqueous secondary battery having an adhesive layer made of a polyvinylidene fluoride resin formed on a polyolefin microporous membrane.

—SEM Photograph Observation—

The surface of the separator of Example 3, the surface of the separator of Comparative Example 1, and the surface of the separator of Reference Example 1 were photographically observed, using a scanning electron microscope manufactured by KEYENCE CORPORATION. The results are shown in FIG. 1 (Example 3), FIG. 2 (Comparative Example 1), and FIG. 3 (Reference Example 1).

In FIG. 1, innumerable particles are shown. It is understood from FIG. 1 that, in the separator of Example 3, the adhesive layer includes an aggregate of particles and a filler, and the particles that include a polyvinylidene fluoride resin retain their particle shape.

Figure 2:
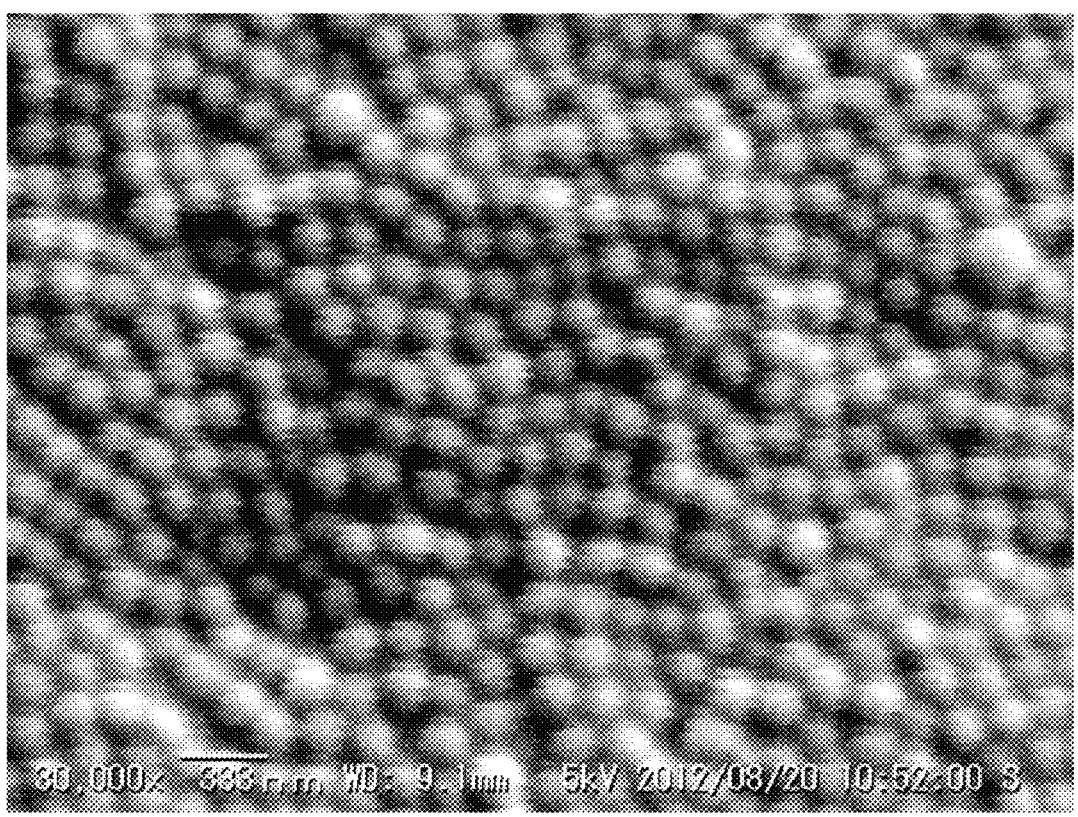
FIG. 2 is an SEM photograph showing the surface of the separator of Comparative Example 1.

Meanwhile, as shown in FIG. 2, it is understood that, in the separator of Comparative Example 1, the adhesive layer is formed only of an aggregate of particles, and has a dense structure.

Figure 3:
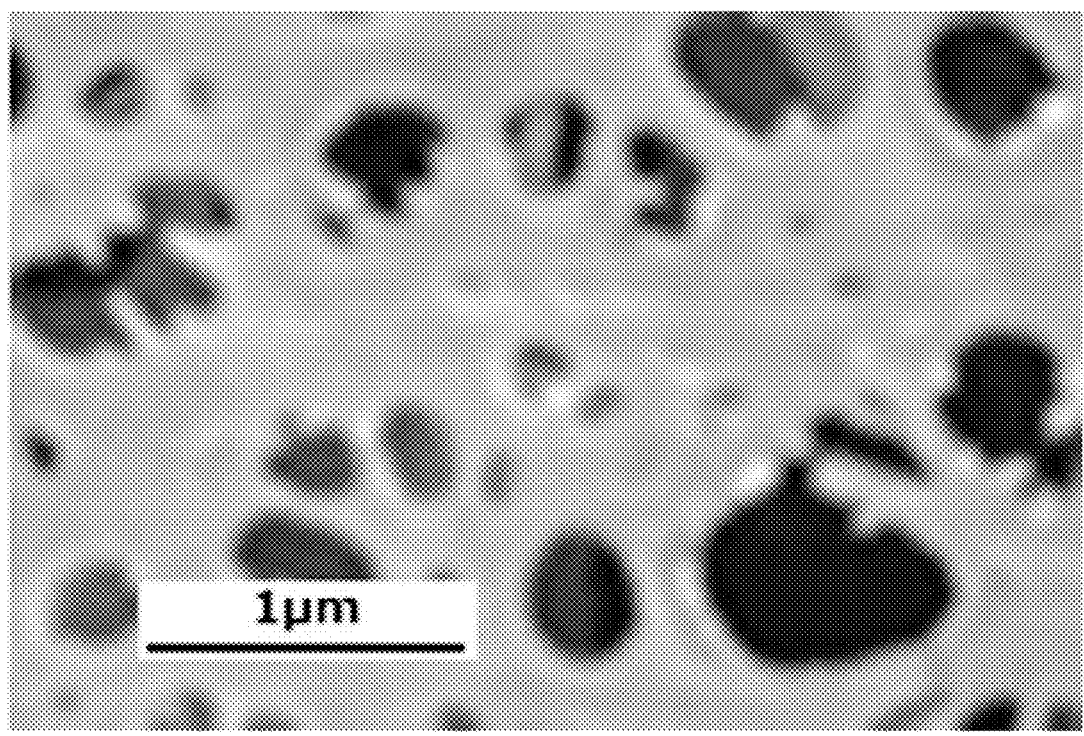
FIG. 3 is an SEM photograph showing the surface of the separator of Reference Example 1.

In FIG. 3 of Reference Example 1, a porous structure in which pores are formed in a continuous uniform layer is observed, and it is understood that the membrane structure is obviously different from an aggregate layer of particles such as those observed in Example 3 or Comparative Example 1.

INDUSTRIAL APPLICABILITY

The separator for a non-aqueous secondary battery of the invention can be suitably used in a non-aqueous secondary battery. Particularly, the separator is suitable for use in a non-aqueous secondary battery having an aluminum laminate outer casing, in which joining to electrodes is important.

The disclosure of Japanese Patent Application No. 2012-052910 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A separator for a non-aqueous secondary battery, comprising:
   a porous substrate, and
   an adhesive layer that is formed on one side or both sides of the porous substrate and is an aggregate layer of particles, the particles including polyvinylidene fluoride resin,
      the adhesive layer further including a filler that includes at least one of an organic compound or an inorganic compound,
      a content of the filler being from 15% by volume to 90% by volume with respect to a total volume of a volume of the particles and a volume of the filler, and
      a content of the particles per one adhesive layer being from 0.4 g/m$^2$ to 0.95 g/m$^2$.

2. The separator for a non-aqueous secondary battery according to claim 1 having a Gurley value of 300 sec/100 cc or less.

3. The separator for a non-aqueous secondary battery according to claim 1, wherein an average particle diameter of the particles is from 0.01 μm to 1 μm.

4. The separator for a non-aqueous secondary battery according to claim 1, wherein the polyvinylidene fluoride resin is a copolymer that includes structural units derived from vinylidene fluoride in an amount of 50 mol % or more with respect to all structural units.

5. The separator for a non-aqueous secondary battery according to claim 1, wherein the organic compound is one or more resins selected from the group consisting of a crosslinked polyacrylic acid, a crosslinked polyacrylic acid ester, a crosslinked polymethacrylic acid, a crosslinked polymethacrylic acid ester, a crosslinked polymethyl methacrylate and a crosslinked polysilicone.

6. The separator for a non-aqueous secondary battery according to claim 1, wherein the inorganic compound is at least one of a metal hydroxide or a metal oxide.

7. A method for manufacturing a separator for a non-aqueous secondary battery according to claim 1, the method comprising:
   coating, on one side or both sides of the porous substrate, a water-based dispersion, the water-based dispersion including
      the particles that include a polyvinylidene fluoride resin and
      the filler that includes at least one of an organic compound or an inorganic compound, and
   drying the coated water-based dispersion.

8. A non-aqueous secondary battery comprising:
   a positive electrode,
   a negative electrode, and
   the separator for a non-aqueous secondary battery according to claim 1, which is disposed between the positive electrode and the negative electrode,
      wherein, in the non-aqueous secondary battery, electromotive force is obtained by lithium doping/dedoping.

* * * * *